Sept. 1, 1936.  J. WINKLER  2,052,686
MULTIRANGE REGENERATIVE RECEIVER
Filed Aug. 14, 1934
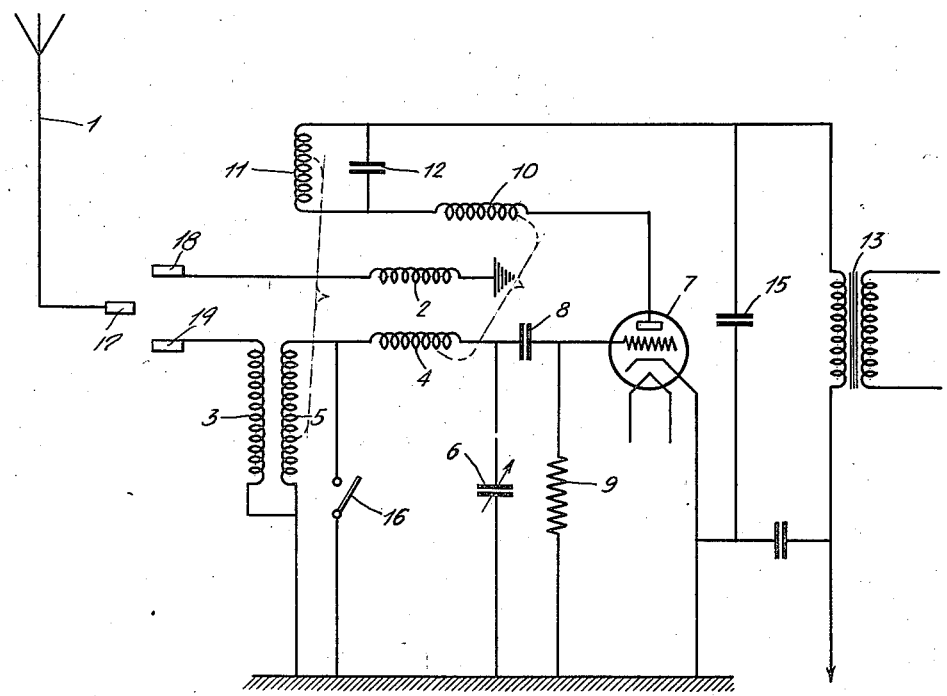
INVENTOR
JOHANNES WINKLER
BY
ATTORNEY Patented Sept. 1, 1936

2,052,686

UNITED STATES PATENT OFFICE 2,052,686

MULTIRANGE REGENERATIVE RECEIVER

Johannes Winkler, Berlin, Germany, assignor to Telefunken Gesellschaft für Drahtlose Telegraphie m. b. H., Berlin, Germany, a corporation of Germany Application August 14, 1934, Serial No. 739,743
In Germany August 17, 1933

4 Claims. (Cl. 250—20)

The present invention relates to multi-range receivers and more particularly to circuits adapted to receive signals within different wave-length ranges incorporating regeneratively coupled electronic tubes.

If in a receiver using regeneratively coupled electronic tubes frequencies of various order are to be received it has been hitherto necessary to switch the feed-back coils when the receiving coils were switched in changing from one frequency range to another. In such systems the switch serving for the change of the wave range obviously would have a great number of contacts and consequently would involve a considerable increase in the cost of the set.

In accordance with the present invention it is proposed to only provide for switching the receiving coils and to combine the feedback path by two coils placed in series whereby the one coil is bridged by a condenser.

An embodiment of the inventive idea is shown in the figure by way of example in connection with the detector stage of a receiver. The antenna 1, by means of a plug in device 17, 18 and 19, can be connected either to the coil 2 or coil 3, whereby the first one serves for the reception of very short waves and the other one for receiving longer waves. The coils 2 and 3 are respectively coupled to the circuit coils 4 and 5 connected in series with each other, and forming together with the variable condenser 6, the tunable input circuit for the audion tube 7. Condenser 8 and resistance 9 show the usual arrangement for obtaining grid detection. The anode circuit of the audion tube 7 includes in series the feedback coil 10 (for short waves) and the feedback coil 11 (for long waves) bridged by a condenser 12, and furthermore the ordinary audio-frequency output arrangement consisting of output transformer 13 and bridging condenser 15. The feedback coil 10 is coupled to the coil 4 of the input circuit, the coil 11 is coupled to the coil 5 of the input circuit. Numeral 16 designates the wave switch by means of which the coil 5 of the input circuit will be short circuited.

The feedback coils 10 and 11 and the condenser 12 are so proportioned and the degree of coupling between coil 11 and coil 5 and between coil 10 and coil 4 so chosen that when long wave reception is desired (plug 17 is connected to element 19 and switch 16 is open) the feedback is substantially all obtained through the coupling between coils 11 and 5. When it is desired to receive short-waves then the plug 17 is connected to element 18 and the switch 16 is closed. Upon closure, switch 16 short-circuits coil 5. For short-wave reception the feedback is between coils 10 and 4, it being noted that condenser 12 has a value such that the coil 11 is effectively shunted by the condenser for short-waves.

Hence a switching of the wave range can be accomplished simply by short circuiting the coil 5 by means of switch 16 without simultaneously switching the feedback coils.

I claim:

1. In a receiving circuit, a thermionic tube provided with an input circuit and an output circuit, a pair of intermediate circuits, a pair of coupling means in said input circuit, said coupling means being arranged so as to couple both of the intermediate circuits to the input circuit, a pair of coupling means in the output circuit cooperating with the two input circuit coupling means to provide a double feed-back coupling between the output circuit and the input circuit, a source of signal energy and selector switching means for coupling said source to either of said intermediate circuits.

2. In a multi-wave length range receiver, an electronic tube provided with an anode, a cathode and a grid electrode, an input circuit for said tube comprising a connection between the grid electrode and the cathode and including a pair of inductance coils in series, variable tuning means for said input circuit and a circuit including a switching means for selectively short-circuiting one of said coils, an output circuit for said tube comprising a connection between the anode and cathode thereof, said connection including a pair of inductance coils in series, said two last-named coils being coupled respectively to the two coils in the input circuit whereby there are provided two regenerative feed-back couplings between the input circuit and the output circuit, a condenser connected across the coil in the output which is associated with the coil in the input circuit provided with the short-circuiting means, the two output circuit inductance coils and the condenser being electrically proportioned so that when neither one of the input coils is short-circuited, feed-back between the input circuit and the output circuit is substantially obtained only through one of said couplings whereas when said short-circuiting means is operated to short-circuit the coil, feed-back between the two circuits is obtained substantially only through the other coupling.

3. In a multi-range receiver, a regeneratively connected detector tube having a tunable input circuit and an output circuit, the regenerative connection between the input and output circuit being characterized by that two feed-back couplings are provided by means of two series coils in the output circuit of the tube coupled respectively to two series coils in the input circuit of the tube, one of the input series coils having connected thereacross a switch operated short-circuiting circuit, the series coil in the output circuit associated with the last-named input circuit series coil having shunted across it a condenser, a source of signal energy and selector means for transferring signals from said source to the input circuit of the tube through the last-named series input circuit coil when the signals transferred are within one wave-length range and through the other of the series input circuit coils when signals are within another wave-length range, the first named series input circuit coil being short-circuited when signals are impressed across the other series input circuit coil.

4. A system as described in the next preceding claim further characterized by that the two series coils in the output circuit of the tube and the shunting condenser are electrically proportioned relative to one another so that feed-back is substantially only obtained through one of said feed-back couplings for one wave length range and substantially only through the other feed-back coupling for the other of said wave-length ranges.

JOHANNES WINKLER.